United States Patent [19]

Korner et al.

[11] Patent Number: 4,950,215

[45] Date of Patent: Aug. 21, 1990

[54] SELF-LOCKING DIFFERENTIAL GEARING

[75] Inventors: Tillmann Korner, Stuttgart; Klaus Brosius, Heidenheim, both of Fed. Rep. of Germany

[73] Assignee: J. M. Voith GmbH, Heidenheim, Fed. Rep. of Germany

[21] Appl. No.: 328,969

[22] Filed: Mar. 27, 1989

[30] Foreign Application Priority Data

Mar. 25, 1988 [DE] Fed. Rep. of Germany ....... 3810169

[51] Int. Cl.$^5$ .............................................. F16H 1/42
[52] U.S. Cl. ................................................... 475/252
[58] Field of Search ................... 74/711, 714; 475/220, 475/248, 252

[56] References Cited

U.S. PATENT DOCUMENTS

| | | | |
|---|---|---|---|
| 1,229,548 | 6/1917 | Van Sant et al. | 74/711 |
| 2,269,734 | 1/1942 | Powell | 74/714 |
| 2,788,679 | 4/1957 | Mott | 74/714 |
| 2,972,265 | 2/1961 | Walter | 74/714 X |
| 3,251,244 | 5/1966 | Nickell | 74/711 |
| 3,375,735 | 4/1968 | Saari | 74/711 |
| 3,706,239 | 12/1972 | Myers | 74/714 X |
| 3,738,192 | 6/1973 | Belansky | 74/714 X |
| 3,768,336 | 10/1973 | Wharton | 74/714 |
| 4,272,993 | 6/1981 | Kopich | 74/711 |

FOREIGN PATENT DOCUMENTS

| | | |
|---|---|---|
| 2300343 | 9/1983 | Fed. Rep. of Germany . |
| 2931220 | 10/1983 | Fed. Rep. of Germany . |
| 3600385 | 7/1986 | Fed. Rep. of Germany . |
| 3542184 | 6/1987 | Fed. Rep. of Germany . |

OTHER PUBLICATIONS

"Zahnradgetriebe", (Johannes Looman, Konstruktionsbucher, vol. 16, Springer-Verlag), pp. 218–219.

*Primary Examiner*—Dwight Diehl
*Attorney, Agent, or Firm*—Jeffers, Hoffman & Niewyk

[57] ABSTRACT

A differential gearing, in which the torque introduced via an input shaft is distributed equally to two driven shafts, is constructed as a spur gear differential and has a pinion arrangement as the locking mechanism in which the pinions and spur gears work as geared pumps. The pump moment is directly the locking moment, with the hydrostatic pressure developed being reduced by precisely dimensioned clearances without any further control devices being required. A special arrangement of the pinions in a housing guarantees an equal locking moment in both directions of rotation.

3 Claims, 2 Drawing Sheets

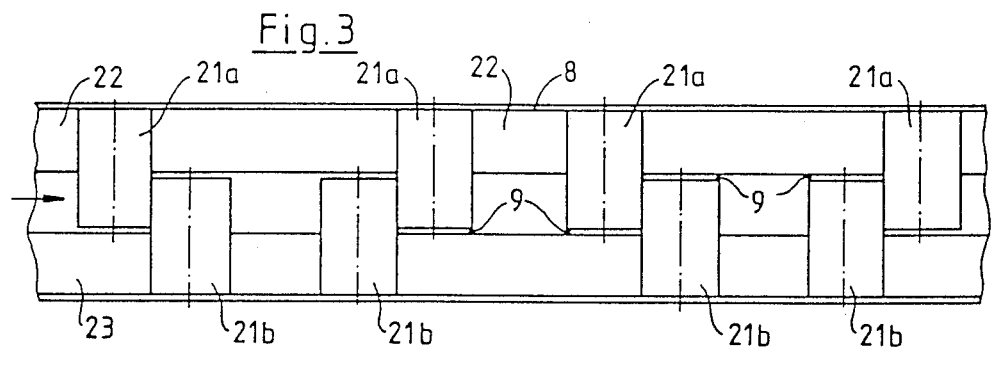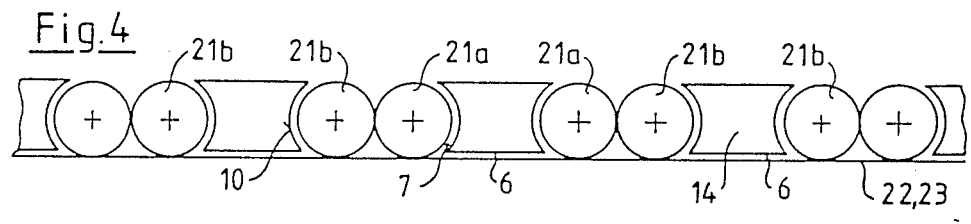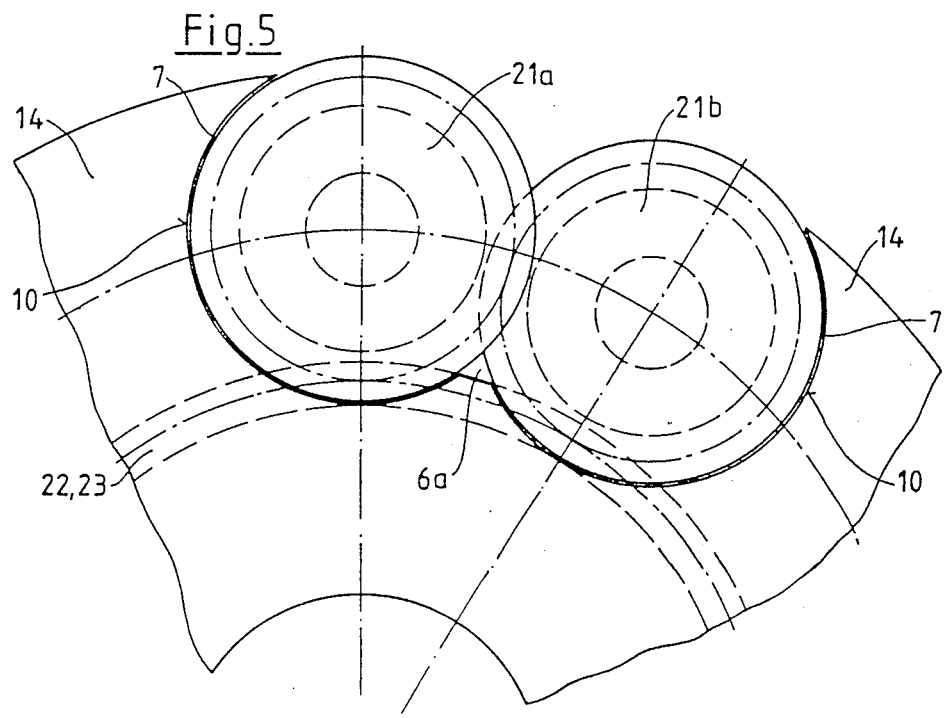

4,950,215

SELF-LOCKING DIFFERENTIAL GEARING

BACKGROUND OF THE INVENTION

The invention relates to a differential gearing for the distribution of torque from an input shaft to two driven shafts, having a first gearing component connected to the input shaft, and which is in permanent rotatable connection with two further gearing components connected respectively to the two driven shafts, said gearing also having a hydraulic self-locking mechanism comprising pinions, which are connected to the first gearing component, and which are tightly contained within a housing and work in conjunction with the second and/or third gearing components as a geared pump having throttling clearances. Such a differential gearing is used in motor vehicles, for example, to transmit the driving torque to the two wheels of a driving axle or also in a drive line between several driven axles.

The invention proceeds from a differential gearing with a hydrostatic self-locking mechanism known from German Patent Document No. 35 42 184. This known design involves a differential gearing having planets which mesh on the one hand with an internally toothed annular gear wheel and on the other hand with an externally toothed sun wheel, with all the gear wheels being disposed in one plane. The torques transmitted to the two driven shafts vary in magnitude. The locking effect is based on the fact that the epicyclic spur gears with the inner sun wheel work as geared pumps with the relative rotation of the two driven shafts, i.e., when cornering or if the gear wheels connected to the driven shafts fully rotate. At the same time the pressure medium, normally lubricating oil, inside the differential gearing and forced radially outwards, is engaged by the toothing of the epicyclic gears and is conveyed radially inwards. At the same time the planet carrier is constructed as a pump housing tightly enclosing the epicyclic gears and the inner sun wheel. The locking moment is produced by the build-up of hydrostatic pressure, which is built up by clearances between the toothing and the housing and by axial clearances. The tighter the planets fit in the confined housing, the higher the locking moment is. Consequently, the planets have the tendency to restrain the relative rotation between the inner and outer sun wheel.

The known spur gear differential has the property that the input torque is distributed to the two driven shafts only in proportion to the radii of the inner and outer sun wheel respectively. It is not possible to distribute the torque equally to the two driven shafts. With a locking differential of the type described, the locking moment is distributed in the same ratio as the drive torque in the locking situation where there is a force-locking design.

For drives in which an equal torque is required for both driven shafts, differential gears are known from the text book "Zahnradgetriebe" (Johannes Looman, Konstruktionsbucher Vol. 16, Springer-Verlag) Pages 218–219. For bevel gear differentials as shown in FIG. 7.20, which are used especially between the two gear wheels of a drive axle, there are also known locking mechanisms of the type with which the resultant axial force from the toothing is used to operate a friction brake. From German Patent Document No. 23 00 343 there is also known a locking mechanism with which the two driven shafts are connected to the two halves of a viscous clutch, so that there is a permanent frictional connection between the two driven shafts.

Mechanical form-locking and externally controlled hydraulic locking mechanisms are too expensive and unreliable, especially for heavy vehicles. Furthermore, viscous locking mechanisms occupy a too great space.

SUMMARY OF THE INVENTION

The object of the invention is to create a spur gear differential gearing which transmits an equal torque to the two driven shafts respectively, with a locking mechanism which simply develops a high locking moment, uses it without delay and smoothly, and nevertheless can be slipped.

This object is achieved by the present invention in that the second and third gearing components are constructed as spur gears of equal size, that alone being known from the text book mentioned at the beginning in FIGS. 7.17 and 7.19. The first gearing component connected to the drive comprises mutually meshing pinion pairs, which are disposed in a common housing so that in each pair one pinion engages with the spur gear of the second gearing component and the other pinion engages with the spur gear of the third gearing component. The spur gears of the second and third gearing components are tightly enclosed together with the pinions of the first gearing component and together form geared pumps, with tip and lateral clearance spaces being provided between the gear wheels and the housing.

In accordance with the invention provision is also made for the first gearing component to have an even number of pinion pairs. The arrangement is made so that, seen in the circumferential direction of the spur gears, the pinion pairs are disposed alternately so that one pinion engages with the spur gear of the second gearing component and the other pinion engages with the spur gear of the third gearing component, whereas with the next following pinion pair the other pinion meshes with the spur gear of the third gearing component, followed by the first pinion in engagement with the spur gear of the second gearing component.

The following advantages are achieved with this arrangement: The special design of a spur gear differential on two planes with identical sun wheels beneath one another guarantees an equal torque distribution to the two driven shafts, with the locking effect, which alone is known in principle, being achieved by the pinions forming geared pumps with the spur gears as soon as a relative rotation occurs between the pinions and the spur gears when there is a difference in speed between the two driven shafts. The pump moment produced at the same time by the hydrostatic counterpressure is directly used as a locking moment for the differential gearing. As is known in principle from German Patent Document No. 35 42 184, the pump moment results from the clearances between the gear wheels and the housing surrounding them being dimensioned so that, before the teeth of the spur wheels and pinions engage, the pressure medium has to be displaced in precisely measured amounts contrary to the discharge direction on the front side and via the tooth tips. With such a hydrostatically self-locking spur gear differential gearing, an advantageous linear relationship between the differential speed of the driven shafts and the level of the locking moment is automatically produced as a result of the clearance throttling of the pressure medium. As a result of a further special arrangement and of the number of pinion pairs, an identical locking moment is produced in both directions of rotation, with the same respective speed difference, despite the use of a gearing on two planes. Another decisive advantage of the hydrostatically self-locking differential gearing is that counter-measures are taken without delay against skidding, e.g., with motor vehicles. The same also applies to tracked vehicles with split axles and drive via differential gearing.

In accordance with a further aspect of the invention, the spur gears of the second and third gearing components are preferably constructed as externally toothed spur wheels. Another aspect of the invention specifies that the material for the pinions and spur gears forming the geared pumps is chosen to match the material for the housing enclosing them so that, even when the temperature of the pressure medium is relatively high, the clearances between the gears and the housing are influenced so that the same locking moment is produced as at a lower temperature. Yet another aspect of the invention specifies that the pinions form geared pumps respectively underneath one another. A further aspect of the invention specifies that the housing with the pinions is provided with a casing which can be sealed from the interior of the remaining gearing and is provided with a supply line and a discharge line. As a result not only the intake of the pressure medium to be conveyed is positively influenced in the region of the pinions, but the separation of the interior of the differential gearing from the remaining gearing reduces efficiency-dissipating leakages caused by splashing.

The invention is explained in more detail below by means of the drawings, which show an exemplified embodiment.

BRIEF DESCRIPTION OF THE DRAWINGS

FIG. 3 shows a diagrammatic representation of the pinions in the circumferential direction;

FIG. 4 shows a front view of the pinions as shown in FIG. 3; and

FIG. 5 shows a representation of a pair of pinions inside the housing.

DETAILED DESCRIPTION OF THE PREFERRED EMBODIMENT

Figure 1:
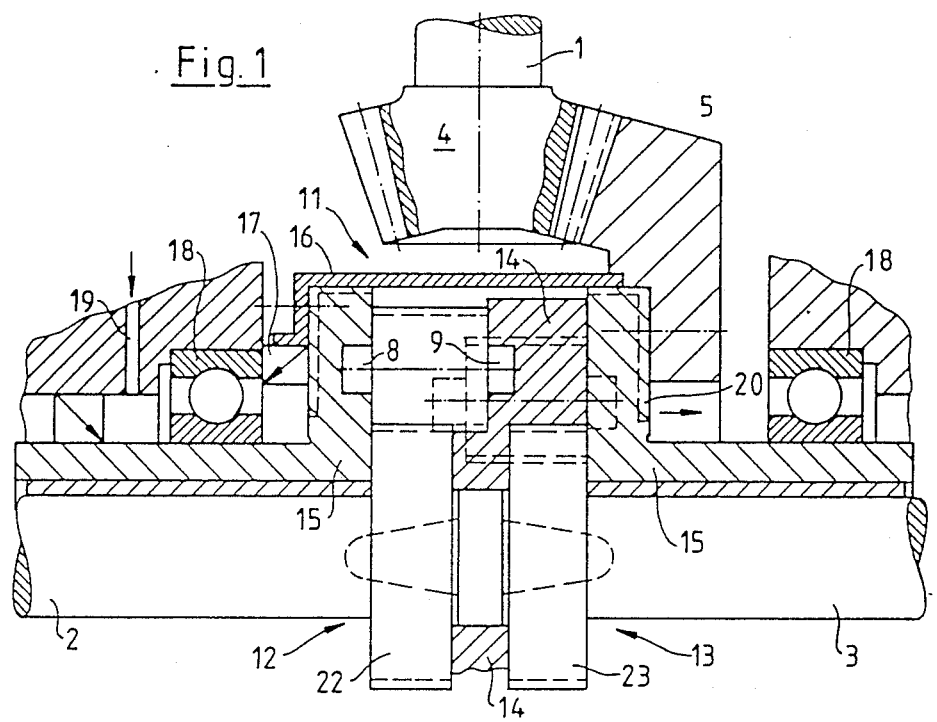
FIG. 1 shows a diagrammatic longitudinal section through a differential gearing along line I—I in FIG. 2.
Figure 2:
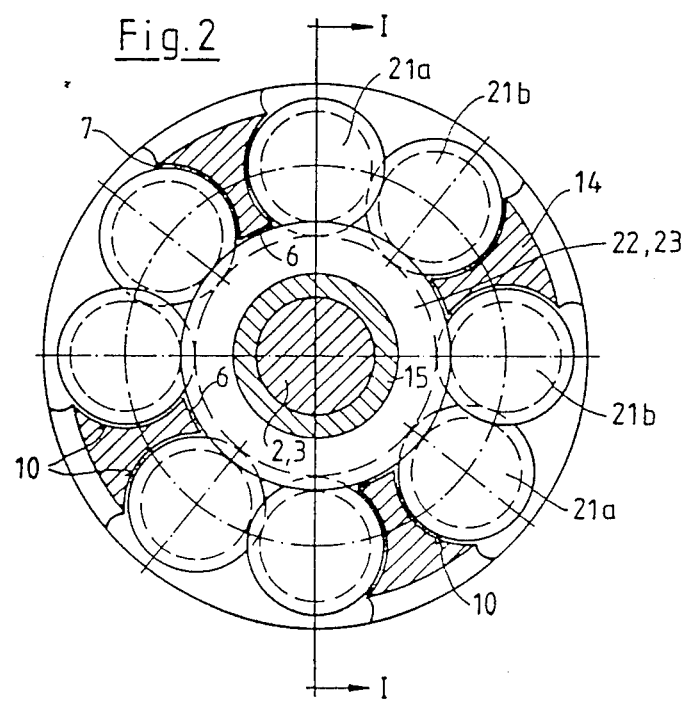
FIG. 2 shows a diagrammatic front view.

The differential gearing shown in FIGS. 1 and 2 comprises a drive shaft 1 connected to the engine and two driven shafts 2 and 3. To the drive shaft 1 is connected a bevel pinion 4, which engages with a bevel gear 5. The differential gearing also comprises a first gearing component 11, which is connected to the bevel gear 5, and second and third gearing components 12, 13 which are connected to the driven shafts 2, 3. To the first gearing component 11 there belongs a housing 14, in which pinions 21a, 21b are lodged paraxially to the driven shafts and engage with spur gears 22, 23. The spur gears 22, 23 are connected to the second and third gearing components 12, 13 respectively, and they are disposed, as known in principle, so that the pinion 21a engages with spur gear 22, pinion 21b engages with spur gear 23 and so that the pinions 21a and 21b are designed with such a width and at such proximity in the housing 14 that they mesh with one another.

The spur gears 22, 23 are disposed coaxially and consequently they are only connected to one another via the pinions 21a, 21b. If the rotational speed of the driven shafts 2, 3 is equal, there is no relative rotation of the pinions around their own axis. However if the rotational speeds differ, the pinions 21a, 21b rotate in different directions of rotation depending on which drive shaft, 2 or 3, rotates more quickly or more slowly.

To achieve an automatic locking effect, provision is made to construct the spur gears 22, 23 and the pinions 21a, 21b as geared pumps, with the pump moment developed directly representing the locking moment between the two driven shafts. For this purpose the housing 14 is constructed so that it encloses the pinions 21a, 21b and the spur gears 22, 23 so tightly that there are tip clearance spaces of a precisely stipulated width between the gear tips and the housing. The housing 14 is surrounded on both sides by lateral members 15, in which the bearing of the pinions is also located. Between the pinions 21a, 21b and spur gears 22, 23 respectively and the lateral members 15 there are also precisely set face clearance spaces 8, 9. In the region of engagement between the pinions and the spur gears there are pressure chambers 6, which are connected by pressure with the tip clearances 7 and the face clearances 8, 9.

Such a differential gearing is normally lodged in a housing filled with lubricant so that the lubricant serves as the pressure medium for the geared pumps. If the housing dips into the medium, the pinions 21a, 21b convey medium from the radially outward position to the respective spur wheel. The hydrostatic pressure built up is then directly reduced again by throttled spraying from the clearances 7, 8, 9 described. No other control measures are required. The advantageous result is a gentle and steady increase in the locking effect with a small relative speed of rotation with a roughly linearly increasing characteristic curve. The absolute dimension for the level of the locking moment can be varied by dimensioning the clearances, depending on the respective case.

As already mentioned, the pinions 21a, 21b rotate in both directions, depending on the relative direction of rotation of the driven shafts 2, 3. However at the same time the pinions working as geared pumps develop a different effect because the pressure chamber 6 for a specific pinion is only fully effective in a determined direction of rotation. No complete build-up of hydrostatic pressure is possible in the other direction of rotation because of the housing construction in the region of the engagement of the teeth with the adjacent pinion.

So that the differential gearing nevertheless develops an equal locking moment in both relative directions of rotation of the driven shafts 2, 3, as shown in FIGS. 3 and 4 of the invention, there is provided an even number of pinion pairs 21a, 21b with the pinion pairs being arranged alternately over the circumference. If, for example, seen in the direction of the arrow in FIG. 3, the spur gear 22 firstly meshes with pinion 21a, behind this pinion 21b meshes with spur gear 23, then the next pinion pair is arranged so that the pinion 21b firstly engages in spur wheel 23, followed by pinion 21a in spur gear 22. From FIG. 4 it becomes clear that with this sequence, which is only possible with an even number of pinion pairs, the same number of pressure chambers 6 is fully effective with each relative direction of rotation. This is so if the pinions convey the pressure medium respectively along the wall region 10 to the spur gears. This in turn is only achieved with the special staggered arrangement shown in FIG. 3.

The exemplified embodiment represented shows a differential gearing in which the spur gears 22, 23 of the second and third gearing components have external toothing. However, it would be possible to construct them as internally toothed annular gear wheels in the same way.

So as to keep the locking effect, which is only produced by throttling the flow of the pressure medium in the clearances, as constant as possible in a large temperature range, the invention proposes the selection of a special material for the geared pumps. It is advantageous if the housing (not shown) is manufactured from a material, at least in the region of the wall 10, i.e., in the region of the clearances 7, 8, 9, which has a coefficient of thermal expansion which is less than the respective value of the material for the spur gears 22, 23 and the pinions 21a, 21b. The result of this is that the clearances 7, 8, 9 decreases as temperature increases, which leads to a compensation of the locking effect in the event of a reduction in the viscosity of the pressure medium.

It is also advantageous to provide the housing 14 with a casing 16 into which pressure medium is introduced through a supply line 19, independently from the lubricant content of the rest of the gearing housing. As a result losses in efficiency caused by splashing in the oil sump can be reduced. As only the compensation of leakages is involved, the pressure medium can be supplied through the region of the bearing 18, for example, and a seal 17 and a discharge line 20 are also expedient.

FIG. 5 shows a cross-section through the region of engagement of two adjacent pinions 21a and 21b and their arrangement inside the housing 14 containing them. This region therefore lies in a central plane between the two spur gears 22 and 23 respectively, in which neither of the two pinions engages with the associated spur gear. The housing 14 therefore encloses the two pinions in a very large circumferential region when compared with the other engagement position. The medium conveyed along the tip clearance 7 by the teeth with a corresponding direction of rotation is conveyed to a pressure chamber 6a, in which particularly high pressure can build up. This pressure can again escape via the mentioned tip clearances 7, the face clearances 8 and 9 already described and the tooth spaces. Consequently it should be acknowledged that at their full width the pinions 21a and 21b contribute to a build-up of pressure and to the formation of a locking moment, provided that the direction of rotation is appropriate.

What is claimed is:

1. A self-locking differential gearing for the distribution of a torque from an input shaft to two driven shafts, comprising:

a first gearing component comprising a drive gear drivingly connected to the input shaft, said first gearing component including an even number of pairs of parallel, mutually engaging pinions connected thereto, engaged said pinions functioning as gear pumps;

a second and a third gearing component, each being connected respectively to the two driven shafts and in permanent rotatable connection with said first gearing component, each said second and third gearing component being constructed as a spur gear equal in size to each other and having spur toothing, one set of said pinions meshing with one said spur gear and another set of said pinions meshing with the other spur gear, adjacent pinions of respective pairs meshing with the same said spur gear, the axis of rotation of said spur gears being mutually coaxial and parallel to the axes of rotation of said pinions;

hydraulic self-locking means for mutual locking with controlled slip of said second and third gearing components, said means including a housing forming a part of said first gearing component in which said pinions and said spur gears are tightly contained, the outer peripheries of said pinions being in close proximity to said housing to form throttling tip clearances for a hydraulic pressure medium, end faces of said pinions being in close proximity to said housing to form throttling face clearances for the hydraulic pressure medium;

each of said pinions having only a single set of teeth thereon, said teeth meshing with a respective said spur gear and meshing with the other pinion of the respective pair;

a pressure space being formed in the mutual meshing area of each pair of said pinions; and a casing enclosing said housing and rendering said housing liquid tight.

2. A differential gearing according to claim 1 in which the pinions of the first gearing component and the spur gears of the second and third gearing components are made from a different material than said housing, with the material for the pinions and spur gears having a higher coefficient of thermal expansion than the material for the housing, whereby reduction in the locking effect due to an increase in temperature of the hydraulic pressure medium is compensated by reduction of the throttling clearances.

3. A differential gearing according to claim 1 in which the casing has a radially inner region sealed against egress of pressure medium and is connected to a supply line for supplying pressure medium into the inner region of the casing, and further including a drain for draining pressure medium from the inner region of the casing.

* * * * *